United States Patent
Hirsch (10) Patent No.: US 8,155,641 B2
(45) Date of Patent: Apr. 10, 2012

(54) SYSTEM AND METHOD FOR PREVENTING LAPSES OF COMMUNICATION IN RADIO VOICE COMMUNICATIONS

(76) Inventor: Michael Hirsch, Los Angeles, CA (US)

( * ) Notice: Subject to any disclaimer, the term of this patent is extended or adjusted under 35 U.S.C. 154(b) by 518 days.

(21) Appl. No.: 12/345,191

(22) Filed: Dec. 29, 2008

(65) Prior Publication Data
US 2009/0170506 A1 Jul. 2, 2009

Related U.S. Application Data

(60) Provisional application No. 61/017,161, filed on Dec. 27, 2007.

(51) Int. Cl.
*H04W 4/00* (2009.01)
(52) U.S. Cl. ............ 455/431; 455/422.1; 455/296; 455/63.1
(58) Field of Classification Search .......... 455/431, 455/422.1, 1, 296, 63.1, 114.2, 278.1
See application file for complete search history.

(56) References Cited

U.S. PATENT DOCUMENTS

| | | | | |
|---|---|---|---|---|
| 5,566,359 A | * | 10/1996 | Corrigan | 455/78 |
| 6,308,052 B1 | * | 10/2001 | Jamali et al. | 455/78 |
| 7,248,205 B2 | * | 7/2007 | Uchino | 342/70 |

* cited by examiner

*Primary Examiner* — David Q Nguyen
(74) *Attorney, Agent, or Firm* — Julio M. Loza; Loza & Loza, LLP (57) ABSTRACT

A system and method are provided for preventing lapses of communication in radio voice communications. The system may include a communications transceiver for transmitting signals through a communications antenna. A protection antenna, which may be isolated from the communications antenna, may obtain a received signal from a remote transmitter. The received signal may contain a signal of interest that may be combined with interference from the communications the communications transceiver. A protection receiver, coupled to the protection antenna, may obtain a sample of a transmit signal from the communications transceiver. Using the sample of this transmit signal, the protection receiver may remove the interference from the received signal to obtain the signal of interest. If it is determined that a communications channel is blocked, the protection receiver may store the transmit signal and later retransmit the stored transmit signal when the communication channel is unblocked.

20 Claims, 5 Drawing Sheets

SYSTEM AND METHOD FOR PREVENTING LAPSES OF COMMUNICATION IN RADIO VOICE COMMUNICATIONS

CLAIM OF PRIORITY UNDER 35 U.S.C §119

The present Utility Application for Patent claims priority to U.S. Provisional Application No. 61/017,161 entitled "A System and Method for Preventing Lapses of Communication in Radio Voice Communications" filed Dec. 27, 2007, and hereby expressly incorporated by reference herein.

FIELD

The present invention relates to communication systems for preventing lapses of communication in radio voice communications.

BACKGROUND

In civil aviation, very high frequency (VHF) amplitude modulated (AM) radio is typically used for radio voice communication between personnel in the cockpit and personnel in the air traffic control tower. VHF AM radio utilizes "simplex" (also called "half duplex") mode: i.e. a particular channel is used for both sides of a two-way conversation, and only one party can talk at a time (also known as "two way radio"). Operators typically use the word "over" or the letter "K" to indicate that a transmission has ended and that the other party may transmit or rely on the context of the spoken message to perform this function. As there is no guarantee that a transmission has been received, protocol has been established so that the intended receiving station can confirm receipt. This protocol may include confirmation of the instructions. For example, if the control tower states "Gulfstream 234 cleared for takeoff" to the aircraft, the aircraft may reply by stating "234 cleared for takeoff" so the control tower has confirmation the aircraft has received the transmission. However, despite this protocol, lapses of communication may occur having disastrous results.

Simplex communication is used in aviation throughout the world. Consequently, if both parties transmit simultaneously, each party may believe that it has made a successful transmission, but in fact neither transmission may have been heard. In most situations, the unsuccessful transmission is discovered when neither party confirms receipt of the transmission. However, in some situations, particularly during periods of stress or emergency, the lack of confirmation may not be discovered.

An additional problem occurs when several parties are communicating as a group. With aviation radio, all pilots on a channel monitor and follow the communications of all other pilots as well as ground controllers to gain a complete picture of the situation. If a dangerous situation develops, it can be rectified as illustrated by the following example.

(Control tower): "Citation 456 cleared for takeoff, runway 30"

(Aircraft about to land): "Tower, Baron 567 is on short final for 30"

(Control tower): "Correction, Citation 456 hold short of runway, acknowledge"

(Aircraft about to take off): "456, roger, holding short, have Baron on final in sight"

Unfortunately, this situational awareness is sometimes thwarted. Civil aviation voice communication uses amplitude modulation (AM) so if two stations transmit simultaneously, not only will they not hear each other, but other stations monitoring the channel will also be unable to hear either transmission. Instead, other stations will hear a squeal that represents a heterodyne between the two transmitters. Pilots are taught to avoid this situation by listening before transmitting, thus avoiding knowingly interfering with another station. However stations sometimes initiate transmission almost simultaneously and fail to realize that another station is also transmitting. In addition, operators occasionally simply make an error and transmit in the midst of another station's transmission. This is commonly described as having been "blocked" or "stepped-on."

One of the worst aviation accidents in history was a direct result of a "blocked" situation. In this accident, two 747 airlines collided on the runway at Los Rodeos airport in the Canary Islands killing 583 people. In civil aviation, two-way radio communication serves as an umbrella that is intended to be a final protection, however, in this case that did not happen.

In this accident, a Koninklijke Luchtvaart Maatschappij (KLM) 747 was at the end of an active runway awaiting takeoff clearance. At the same time, a Pan American 747 was taxiing down that same runway, also headed toward the takeoff position. KLM received its clearance instructions from the control tower over the radio channel, and then KLM transmitted, "We are now at takeoff." This is not standard aviation phraseology, so the air traffic controller in the tower responded, "OK, standby for takeoff. I will call you." The controller did not intend for KLM to begin its takeoff with Pan American still taxiing down the runway. At the same time, the Pan American crew had the same concern, so they transmitted, "And we're still taxiing down the runway . . . ." Had the controller's transmission and Pan American's transmission not overlapped, this accident would have been prevented.

Recordings from the KLM cockpit voice recorder indicated that the KLM crew heard "OK" followed by a squeal. The KLM pilot misunderstood this as a takeoff clearance and proceeded to attempt takeoff, ultimately colliding with Pan American. If the Pan American crew had realized that the tower controller had been transmitting simultaneously, they could have repeated their transmission, averting disaster. Furthermore, if the tower controller had realized that Pan American had been transmitting simultaneously, he could have repeated his transmission, averting disaster.

In response to this problem, others have proposed anti-blocking devices, typified by U.S. Pat. No. 4,932,071 (Arndt and Rutty). This device basically mechanizes the "listen before you talk" procedure, and provides some additional features. However, it has the critical limitation that once a station has commenced transmitting, it becomes deaf to other transmissions on the channel. Suppose, for example, that the controller at Los Rodeos Airport had been equipped with this device but Pan American had not. The controller could have made his transmission, exactly as he did, and still not have realized that it was blocked by Pan American transmitting a fraction of a second later. U.S. Pat. No. 4,551,854, by the same inventors, performs a generally equivalent function.

U.S. Pat. No. 4,199,661 (White and Blumke) used staggered timers to control when a particular station can seize control of the channel. This can be helpful but still give no benefit in the case where a station is blocked nonetheless. Also, in order for this system to function, all stations must be equipped with the required equipment and it must be working properly.

U.S. Pat. No. 5,566,359 (Corrigan) in effect delays the start of a transmission for a short time, first checking to see that the channel remains clear. Again, this is of no benefit if a blocking signal commences simultaneously or at a later time.

In U.S. Pat. No. 6,308,052 (Jamali and Khatib) two separate channels are used for communication, the "voice" and "service" channels. Whenever a station is transmitting on a voice channel, that station simultaneous transmits a pulsed "beacon" signal on a defined paired service channel. Because the pulsed beacon signal is random in timing and of short duty cycle, according to Jamali et al, several stations can occupy the service channel without mutual interference. Each station monitors the radio frequency (RF) power level in the service channel. If the power in the service channel exceeds some threshold, then both the service channel and the paired voice channel are assumed to be in use.

The technique disclosed by Jamali has several limitations: Firstly, the bandwidth requirement is increased; in their preferred embodiment, it is doubled. Secondly, in order to be useful, all aircraft must be equipped with the described device: no protection is obtained against aircraft not equipped with a beacon transmitter. Thirdly, Jamali et al. fails to consider the effects of not only spurious emissions from the voice transmitter, but also leakage of signals from the beacon transmitter into the beacon detector circuit. Furthermore, the transmitted power level of the beacon would be very weak, due to its low duty cycle. Due to these factors, the ability of this design to reliably detect an occupied channel would be quite limited.

A product called "Contran" is presently manufactured and sold by British Aerospace. This appears to be described in U.S. Pat. Nos. 4,549,309 and 5,566,359. It is substantially equivalent to that described by Arndt et al., described above. Its primary benefit is to prevent a transmission from starting when another transmitter is already operating.

Consequently, a device, system and/or method are needed for preventing lapses of communication in radio voice communications. Radio Technical Commission for Aeronautics (RTCA), Inc. has published document RTCA/DO-209, entitled "Minimum Operational Performance Standards for Devices that Prevent Blocked Channels Used in Two-Way Radio Communication Due to Simultaneous Transmissions". The United States Federal Aviation Administration has adopted this standard as part of Technical Standard Order TSO-C122. The present invention meets and exceeds these requirements.

SUMMARY OF THE INVENTION

One feature is aimed at preventing lapses of communication in radio voice communications in a variety of fields for both civil and military radio communication uses. For example, radio voice communications between personnel in the cockpit of an airplane and personnel in the air traffic control tower. The lapses of communication may be prevented by employing the use of "interference cancellation" which allows broadcast stations to continue receiving communications on a communication channel even while transmitting on that same channel.

According to one feature, interference cancellation is implemented at a ground station and/or aircraft to remove or reduce co-site interference. That is, a receiver may be configured to remove an interfering signal from its corresponding transmitter (e.g., the ground station receiver removes the signal being transmitted by the ground station transmitted or the aircraft receiver removes the signal being transmitted by the aircraft transmitted) so that it can receive a signal of interest (e.g., the ground station receiver receives signals from the aircraft transmitter or the aircraft receiver receives signals from the ground station transmitter).

In one example, a system is provided for transmitting radio communications having no lapses of communication in radio voice communications. The system may include a communications transceiver for transmitting signals through a communications antenna. A protection antenna, which may be isolated from the communications antenna, may obtain a received signal from a remote transmitter. The received signal may contain a signal of interest that may be combined with interference from the communications the communications transceiver. A protection receiver, coupled to the protection antenna, may obtain a sample of a transmit signal from the communications transceiver. Using the sample of this transmit signal, the protection receiver may remove the interference from the received signal to obtain the signal of interest. If it is determined that a communications channel is blocked, the protection receiver may store the transmit signal and later retransmit the stored transmit signal when the communication channel is unblocked.

A warning module may be used for providing audio and/or visual warnings to operators indicating transmission over the communication channel is blocked. For example, an incoming signal of interest may have been blocked (e.g., by an outgoing transmission) and/or an outgoing transmission may have been blocked (e.g., by an incoming signal). The warning module may include lamps, digital displays, or any other indicator means which provide the operator with status information about transmission/reception. Typical light indicators might be, for example, green to represent a clear channel, yellow to represent channel occupied or red to indicate that a transmission is being blocked.

In some implementations, the transceiver and protection receiver may be separate devices. In other implementations, the transceiver and protection receiver may be integrated into a single device.

In some implementations, the communications transceiver may provide its current operating frequency, over a data link, to the protection receiver. In other implementations, the protection receiver may determine the current operating frequency by examining the characteristics of the signal sample on transmission line.

The system of the present invention provides many advantages over existing systems. For example, the system of the present invention may be capable of recognizing when other stations use the same communication channel even if the other station's signal starts simultaneously or after the local signal begins. By recognizing when other stations use the same communication channel, a separate service channel may not be needed and thus spectrum capacity is not wasted.

BRIEF DESCRIPTION OF THE DRAWINGS

The features, nature, and advantages of the present aspects may become more apparent from the detailed description set forth below when taken in conjunction with the drawings in which like reference characters identify correspondingly throughout.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention.

In the following description, specific details are given to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

According to one aspect of the invention, a method, apparatus, and/or system for preventing lapses of communication in radio voice communications are provided. The present invention makes use of a technique called "interference cancellation" to allow a station to continue receiving on a channel even while transmitting on that same channel. If either the controller or Pan American (or both) had been equipped with the invention described herein, then one or both could have known that the transmissions had been blocked and therefore repeated their message preventing the disaster. Using some of the optional features, both messages could have been received by KLM, providing even more protection from the disaster.

Although the method, apparatus, and/or system are described as implemented for the field of aviation, those skilled in the art will recognize that the principles and teachings described herein may be applied to a variety of fields for both civil and military radio communication uses.

According to one feature, interference cancellation is implemented at a ground station and/or aircraft to remove or reduce co-site interference. That is, a receiver may be configured to remove an interfering signal from its corresponding transmitter (e.g., the ground station receiver removes the signal being transmitted by the ground station transmitted or the aircraft receiver removes the signal being transmitted by the aircraft transmitted) so that it can receive a signal of interest (e.g., the ground station receiver receives signals from the aircraft transmitter or the aircraft receiver receives signals from the ground station transmitter).

Figure 1:
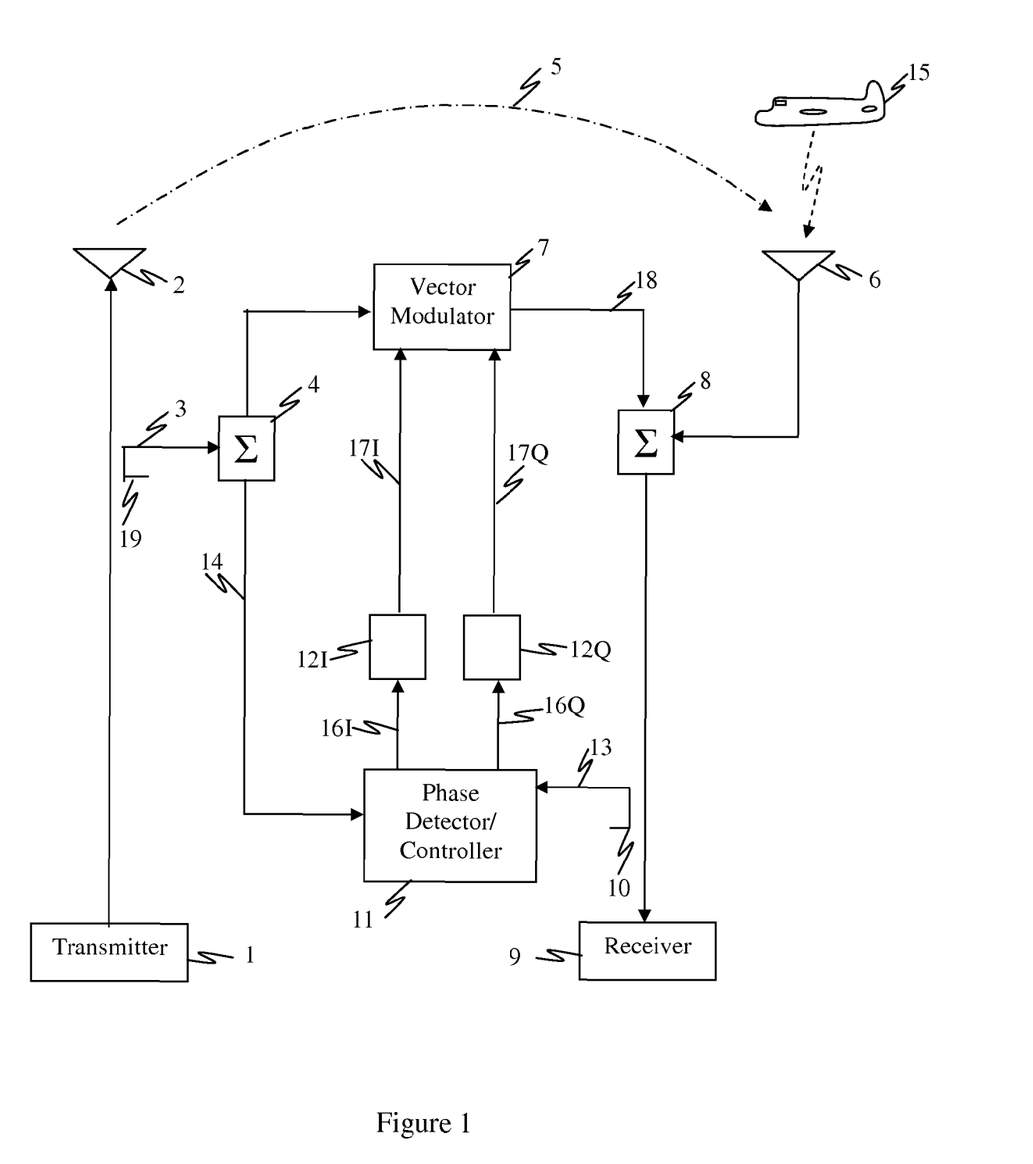
FIG. 1 is a block diagram of a typical interference canceller that may be utilized in the present invention.

FIG. 1 is a block diagram of an interference canceller that may be utilized in one embodiment of the present invention. An aircraft 15 transmits a signal of interest to a receiving antenna 6 coupled to a radio receiver 9. The signal of interest may be contaminated or interfered with by an interference signal 5 transmitted by a radio transmitter 1 through a transmit antenna 2. As the aircraft is transmitting the signal of interest, a sample 3 of the interference signal 5 is taken using a first coupler 19. The sample 3 is then divided into multiple paths by a power divider 4. A first path provides a reference signal 14 to a vector modulator 7 and a second path provides the reference signal 14 to a phase detector/controller 11. The vector modulator 7 adjusts the amplitude and phase of the reference signal 14 and then generates an output signal 18 which is transmitted to a combiner 8. Upon receipt at the combiner 8, the output signal 18 has the same amplitude, but opposite phase, compared to the interference signal 5 resulting in the cancellation of the interference.

The phase detector 11 receives both the reference signal 14 and a sample of the received signal of interest. The residual signal after cancellation is sampled by a second coupler 10 generating an error signal 13. The error signal 13 is then compared to a reference signal 14 by the phase detector 11. To the extent that some of the original interfering signal still remains after cancellation, there will be a constant output from the phase detector 11 outputs. If the signals were perfectly cancelled, the phase detector 11 outputs would be effectively zero. If the cancellation process was not completed, the interference signal 5 would be so large at the receiver 9 that it would prevent reception of signals of interest (SOI) by the receiving antenna 6.

The phase detector I and Q outputs 16I and 16Q may be integrated by conventional analog integrators 12I and 12Q, and the resultant DC outputs 17I and 17Q used to control the vector modulator 7. These resultant DC outputs, or control inputs, 17I and 17Q that are input into that vector modulator 7 may be set by the control loop such that it causes cancellation. When cancellation is complete, the phase detector outputs are zero and the output values of the integrators remain constant at the correct value.

One approach of interference cancellation is "co-site interference mitigation". Co-site interference mitigation is typically used at a location that has multiple transmitters and receivers that operate simultaneously, but on different frequencies. As receivers are desensitized by strong, nearby transmitters, they are not able to receive their intended signal of interest.

Interference cancellers can attenuate unwanted interference by 50 or 60 dB and, in some situations, interference attenuation of 100 dB or more may be achieved.

"Isolation" is another approach that may be used to minimize co-site interference. This approach locates the affected antenna so that the strength of the received signal is minimized. By increasing isolation, the amount of cancellation necessary for good performance is reduced. Several techniques may be used to improve isolation including increasing the physical separation between the interferer and affected antennas and physical shielding. In the case of an aircraft, for example, one antenna may be placed forward and beneath the fuselage while the other antenna may be placed aft and above the fuselage. Alternatively, the wings of the aircraft may be used as shields to increase isolation.

Interference cancellation may also be used to avoid not only unintended interference by nearby transmitters operating on frequencies other than the receiver's listening frequency, but also to mitigate interference placed directly upon the intended receive frequency.

Figure 2:
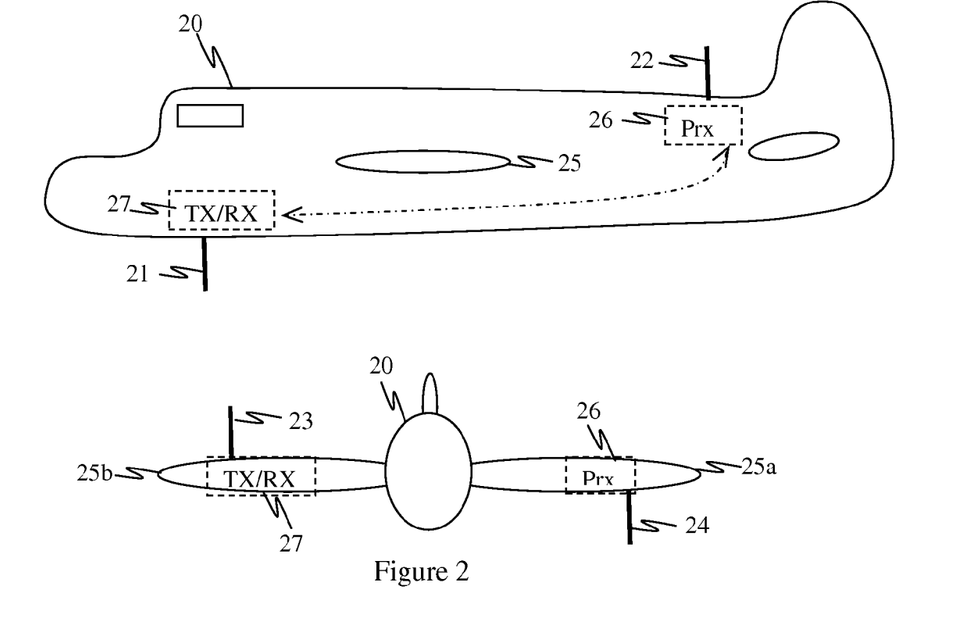
FIG. 2 illustrates an aircraft equipped with one or more radio transceivers, according to one embodiment of the present invention.

FIG. 2 illustrates an aircraft 20 equipped with one or more radio transceivers (e.g., transmitter/receiver combinations TX/RX), according to one embodiment of the present invention. If any of the radio transceivers TX/RX on the aircraft 20 are transmitting ("keyed") information, it may be difficult, if not impossible, to determine if any other station (e.g., a ground station or airport station) is transmitting on the same channel as the aircraft 20. The radio transceiver (e.g., TX/RX 27) on the aircraft may also be referred to as a communications device. The communications device transmitter 27 is connected to a communications antenna 21 on the aircraft 20.

A protection receiver (Prx) 26 is interconnected to the transmitter 27 so that it is aware of the communications transmitter's operating frequency. In one embodiment, the protection receiver 26 is connected to a protection antenna 22 which is separate from the communication antenna 21 utilized by the communication device 27 transmitter. The protection antenna 22 is located in such a manner to provide good isolation, as described above. At the frequencies used for VHF aviation communication, there will be approximately 40 dB of free space loss if the antennas 22 and 21 are separated by 50 feet, for example. Additional isolation may be achieved by using the aircraft fuselage or wings 25 as shields, or if greater separation is possible. With 200 feet of separation, isolation would be approximately 10 dB higher. Alternatively, the communication device antenna 21 and protection receiver antenna 22 may also be located at points 23 and 24 of the aircraft 20 respectively, demonstrating shielding by the wings 25a and 25b. In one embodiment, a common antenna may be shared as shown in U.S. Pat. No. 5,574,978 (Talwar et al.).

It may be assumed that all stations (e.g., ground stations) are providing approximately the same effective radiated power (ERP) as the communications transmitter 27. As such, a canceller circuit may be used to further attenuate the signal transmitted from the communications transmitter 27, as seen by the protection receiver 26, to the extent that the signal from some distant station may be discerned. In some situations, it may be possible to actually receive and understand the signal from that distant station, despite the fact that the local transmitter 27 may be operating on the same channel or frequency. In other situations, it may only be possible to determine that some other station is transmitting but not to understand the specific message being sent.

In one embodiment, the signal of the local communication device transmitter 27, as seen by the protection receiver 26, may be reduced to a level of 10 dB below the signal of interest from the distant transmitter (e.g., signal being received by protection receiver 26 from the ground station).

Assuming 40 dB of isolation and 50 dB of cancellation and assuming the local (e.g., aircraft) and distant transmitters (e.g., ground station) have the same ERP, then the distant transmitter (e.g., ground station) may be located at a distance that provides 80 dB of path loss, approximately one mile. With this range, the tragedy discussed above involving the Pan American and Los Rodeos control towers would have been prevented as both the ground station and aircraft would have known that their transmissions were being blocked.

In another embodiment, with 50 dB of isolation and 80 dB of cancellation, the distant signal (e.g., from the ground station) would be 10 dB stronger than the local transmitter (at the aircraft) when at a distance that provides 120 dB of path loss, approximately 100 miles. Even if this distant transmitter (e.g., ground station) is weak, with an ERP 10 dB less than the local transmitter (e.g., aircraft transmitter), this distance would still be 20 miles. Thus, it can be seen that practically achievable isolation and cancellation allow for detecting a distant transmitter (e.g., ground station) even while keying one's own local transmitter on the same channel.

The specific amount of attenuation needed is difficult to predict, at least in the case of aviation voice communication, which uses amplitude modulation (AM). Unlike frequency modulation (FM) which exhibits a capture effect, in the case of AM, a mixture of the two signals is heard, together with a heterodyne tone in the typical case where both transmitters are on slightly different frequencies. For the purposes of this description, it is assumed that the required suppression of the local transmitter (e.g. aircraft communication device transmitter 27) relative to the signal of interest from the distant transmitter (e.g., ground station) is in the range of 10 to 20 dB.

If by use of isolation and/or cancellation the distant signal (from the ground station) is discerned even in the presence of the local transmitter (aircraft communication device transmitter), the present invention may be directed to take one or more different actions, such as:

1. Allow the operator (at the local receiver) to actually hear the distant transmitter, if it were strong enough, despite the fact that the operator is simultaneously transmitting (e.g., via a local transmitter) on the same channel causing the channel to operate as if it were a duplex channel.

2. Actuate a visible or audible indicator to inform the operator that his transmission is being blocked so that he could then re-transmit the same information when the channel becomes clear.

3. Disable the local transmitter, thus allowing the distant station to transmit into a clear channel and therefore be heard.

4. Disable the local transmitter but automatically record, buffer or queue the words spoken by the operator so that when the channel become clear (available), the local transmitter is automatically re-enabled and the original message is sent as intended, although slightly delayed.

Figure 3:
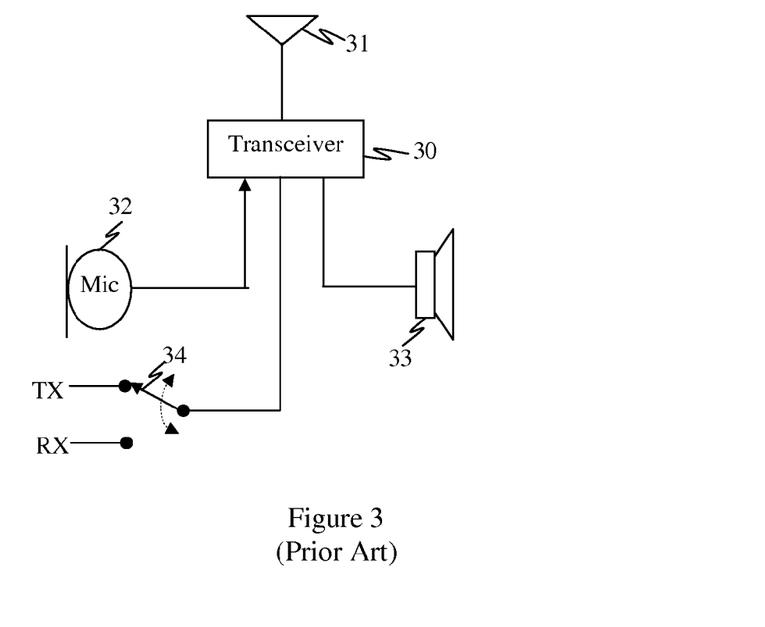
FIG. 3 illustrates a prior art radio transceiver implementation without incorporation of the present invention.

FIG. 3 illustrates an example of a radio transceiver using prior art and not incorporating the present invention. A transceiver 30 transmits and receives signals through a communications antenna 31. An operator speaks into a microphone 32 and listens to received signals through a speaker 33. The operator switches the transceiver 30 from the receive mode to the transmit mode by depressing a push-to-talk (PTT) switch 34. No protection from blocking is provided when using this prior approach.

Figure 4:
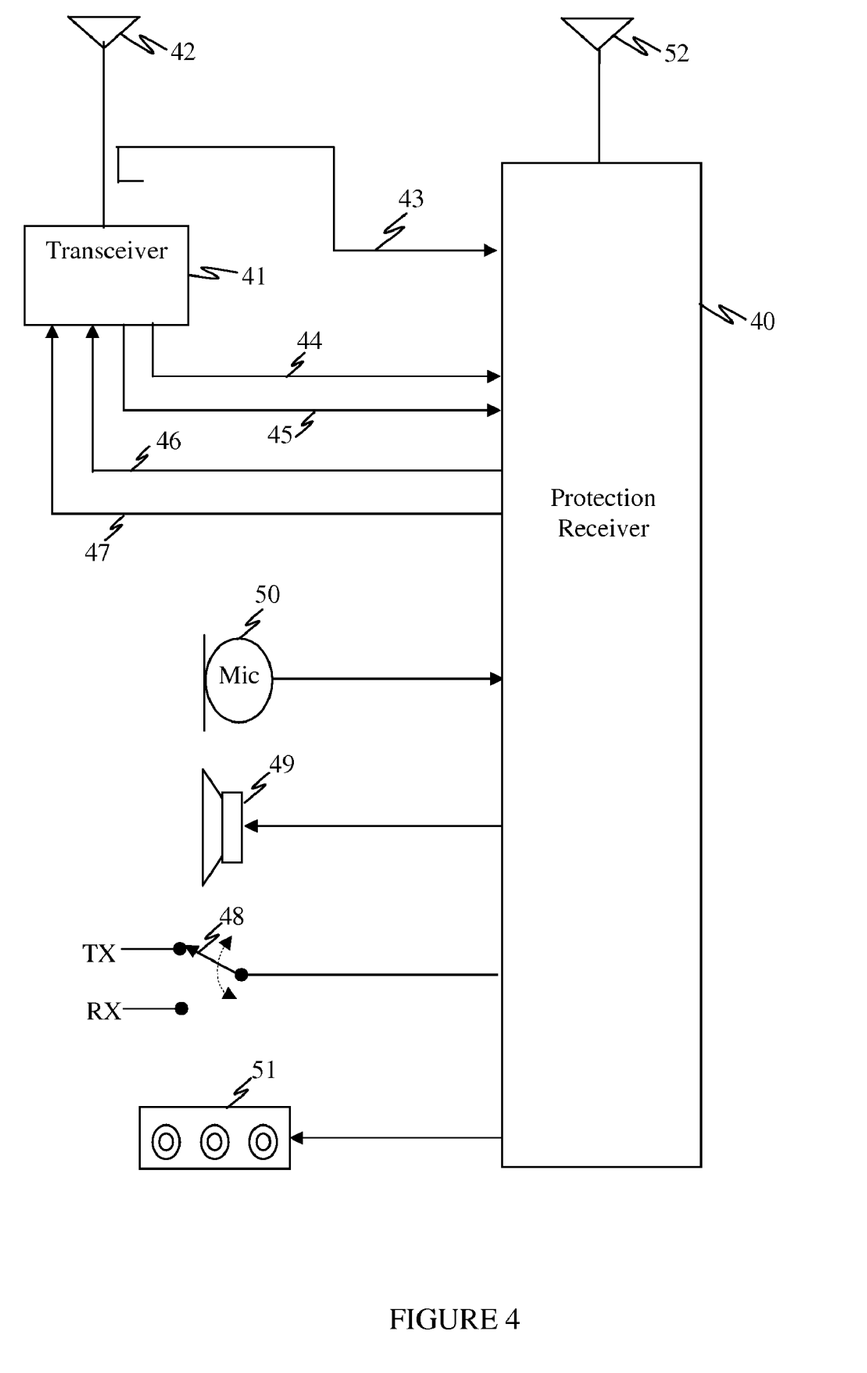
FIG. 4 illustrates a system for transmitting and receiving radio communications, according to one embodiment of the present invention.

FIG. 4 illustrates a system for transmitting radio communications, according to one embodiment of the present invention. The system includes an external protection receiver 40 connected to a communications transceiver 41. According to one feature, this system may allow for the interruption and storage of an audio signal being transmitted at the point it is blocked, and then later transmitting the stored message into a clear channel. As a result, lapses of communication in radio voice communications may be prevented.

The communications transceiver 41 transmits a signal to a communications antenna 42 and a sample of the signal to the protection receiver on transmission line 43. The sample of the signal is used to cancel out any interference on the channel, as described above with reference to FIG. 1.

The communications transceiver 41 may provide its current operating frequency, over a data link 44, to the protection receiver 40. Alternatively, the protection receiver 40 may determine the current operating frequency by examining the characteristics of the signal sample on transmission line 43.

A protection antenna 52 may provide a signal containing a weakened signal of interest from a distant or remote station that may combined or mixed with a strong signal from the communications transceiver 41. That is, if the signal of interest is intended for transceiver 41, it may be on the same frequency or channel as the signal being transmitted by the transceiver 41, consequently, the two signals may be mixed in the transmission medium (e.g., over the air). In one embodiment, the antennas 42 and 52 may be installed to provide good isolation, as described above.

A received audio signal 45 from a receiver in the communications transceiver 41 is provided to the protection receiver 40. The protection receiver 40 may allow an operator to hear the received audio signal 45 through a speaker 49 during normal operation. Alternatively, the protection receiver 40 may transmit a "busy" signal to the speaker 49 to inform the operator that transmission (e.g., signal of interest from another station) is being blocked.

To generate an audio signal, an operator may speak into a microphone 50. During normal transmissions, the protection receiver 40 may connect the audio signal to a microphone input of the communications transceiver 41 on transmission line 46. By transmitting the audio signal (i.e. the operator's speech) to the communications transceiver 41 through the protection receiver 40, the protection receiver 40 may store the audio signal so that if a transmission is blocked or lost, the protection receiver 40 may cause transceiver 41 to retransmit the stored audio signal once the channel becomes available or clear.

A push-to-talk switch 48 may be connected to the protection receiver 40 for switching the transceiver 41 from receive mode to transmit mode. Upon depressing the push-to-talk switch 48, a signal is sent to the communications transceiver 41, over transmission line 47, causing transmission to be initiated. If the transmission channel 47 is occupied, the protection receiver 40 may optionally interrupt this signal, preventing the communications transceiver 41 from transmitting and thus blocking those other stations using the channel. A warning module 51 may provide audio warnings, warning lights, or other indicators that inform the operator whether an incoming signal of interest may have been blocked (e.g., by an outgoing transmission) and/or an outgoing transmission may have been blocked (e.g., by an incoming signal). The warning module 51 may include lamps, digital displays, or any other indicator means. The purpose is to provide the operator with status information about transmission/reception. Typical light indicators might be, for example, green to represent a clear channel, yellow to represent channel occupied or red to indicate that a transmission is being blocked.

Figure 5:
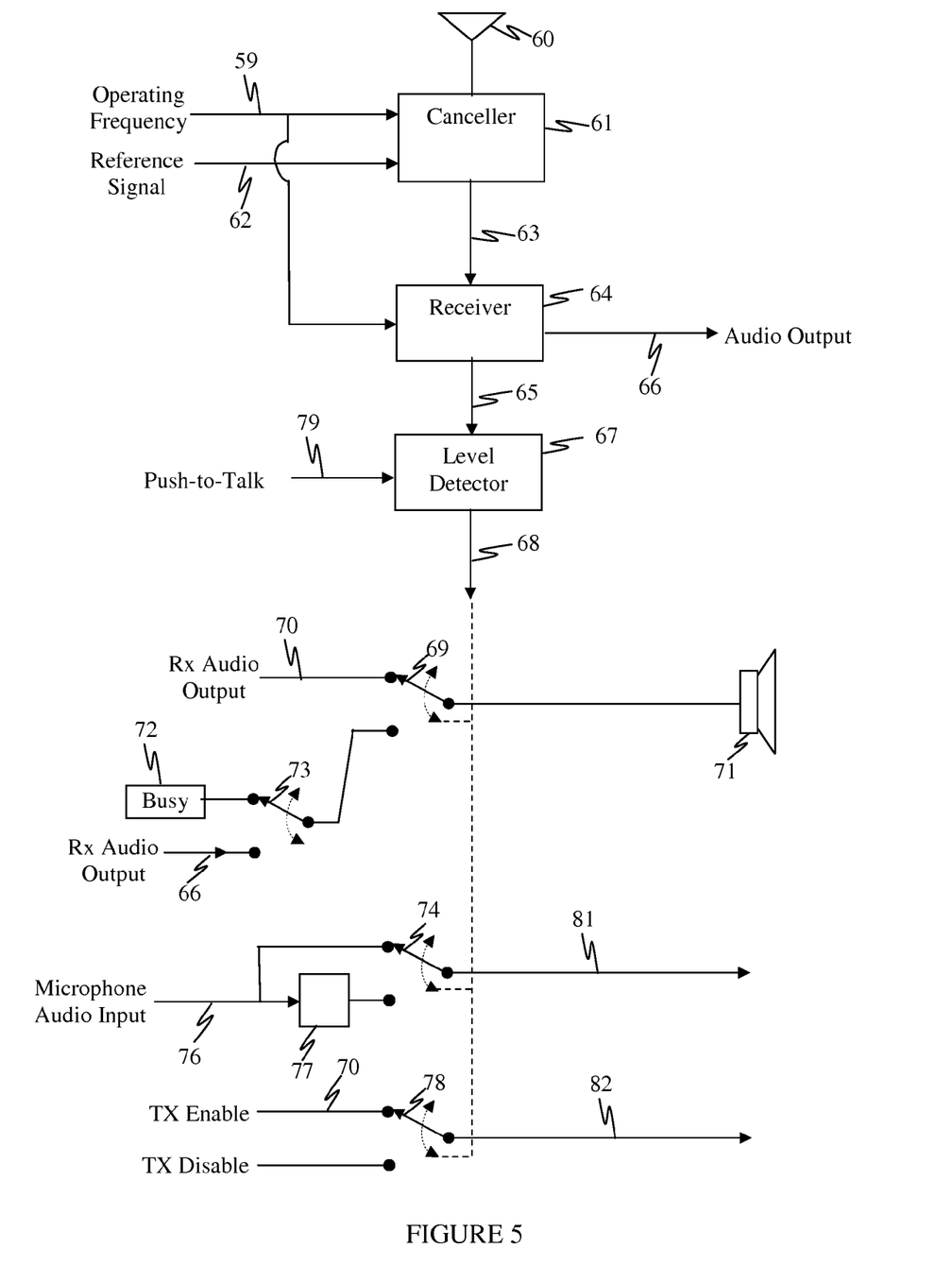
FIG. 5 illustrates the internal operation of a protection receiver, according to one embodiment of the present invention.

FIG. 5 illustrates one example of a protection receiver according to one embodiment of the present invention. In the protection receiver, a protection antenna 60 provides a combination of a signal of interest and (possibly) an interference signal at an operating frequency 59 from a communications transmitter, as described above, to a canceller circuit 61 together with a reference signal 62 sampled from the communications antenna 60. Any type of canceller circuit known in the art may be utilized in the present invention.

The canceller circuit 61 may be aware of the communication transmitters operating frequency as shown on data link 59. As discussed above, the operating frequency may be provided by the communications transceiver or may be obtained by examination of the interference signal. If the operating frequency is not obtained from the communications transceiver, the protection circuit would not know which channel to examine until the communications transmitter is first activated. However, the system of the present invention may continue to provide anti-blocking protection even during transmission.

The output signal 63 of the canceller circuit 61 provides the signal of interest, with the interference signal from the communications transmitter cancelled, to a receiver 64 with the interference substantially attenuated. Within the functional limitations of the canceller, and depending on the relative strengths of the interfering signal and the signal of interest, the remnants of the interfering signal can be considered to be negligible. All that may remain on transmission line 63 is a signal, if any is present, from some other station transmitting on the same channel, whether or not the local communications transmitter is also active.

Any type of receiver known in the art may be used. The receiver 64 outputs a receive signal strength indicator (RSSI) 65 and a demodulated audio output 66. The RSSI signal 65 represents the strength of the residual RF input signal on transmission line 63, after signals from the local communications transmitter have been cancelled out. A level detector circuit 67 compares this level to a predetermined threshold. If the level is above the threshold and if the local communications transmitter is transmitting, a signal from a distant station is known to exist. Whether or not the local communications transmitter is operating can be determined by reference to push-to-talk signal 79, or by measuring the power level seen at antenna 60. In such a case, a signal-of-interest present indicator signal 68 may be provided and used to take appropriate action. Through circuitry, the signal-of-interest present indicator signal 68 may be used to control switches 69, 74, and 78. It should be noted that any type of level detector circuit known in the art may be used.

The switch 69 gates the communications receiver audio output signal 70 to a speaker 71, except when the location communications transmitter is transmitting while a distant station is also transmitting. However, if a distant station is transmitting while the local communications transmitter is transmitting, then the speaker 71 emits a distinctive "busy" tone. This tone is generated by a signal generator 72 and selected by the switch 69. Alternatively, if the remote signal is strong, the operator may hear the other transmitter's message. A demodulated received audio signal 66 comes from the receiver 64 and is selected by switch 73 as an alternative to the busy tone. The position of this switch 73 may be set by the operator, or may be set automatically based on the strength and clarity of the audio signal 66.

The switch 74 gates a microphone audio input signal 76 to the microphone input of the communications transceiver on transmission line 81, except when the local communications transmitter is transmitting while a distant station is also transmitting. However, if a distant station is transmitting while the local communications transmitter is also transmitting, then the microphone audio input signal may be stored in a delay unit or storage medium 77. When the distant station ceases transmitting, the audio signal stored in the delay unit 77 may be selected by the switch 74 and sent to the communications transceiver microphone input on transmission line 81. In this manner, the words of the operator are not lost, merely delayed until they can be successfully transmitted into a clear channel.

The push-to-talk signal on transmission line 79 may be selected by the switch 78 and sent to the communications transmitter push-to-talk input on transmission line 82 allowing the operator to activate the transmitter when desired. However, if a distant station is transmitting while the local communications transmitter is also transmitting, the switch 78 may deselect the push-to-talk input 79, terminating transmission from the local communications transmitter allowing the message of the distant stations to be heard.

Figure 6:
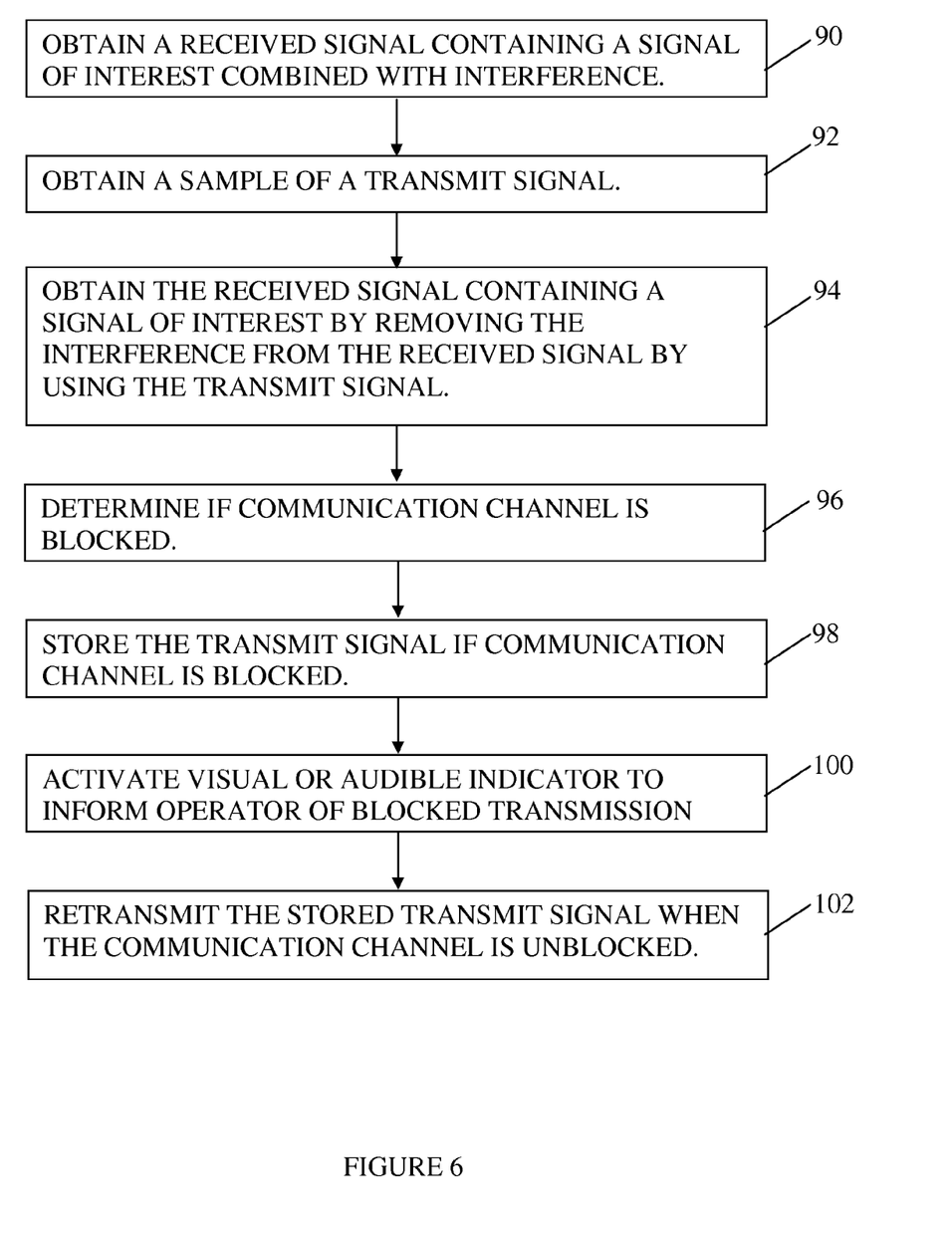
FIG. 6 illustrates a method for preventing lapses of communication in radio voice communications.

FIG. 6 illustrates a method for preventing lapses of communication in radio voice communications. A protection antenna may obtain a received signal which contains a signal of interest combined with interference 90. A protection receiver, coupled to the protection antenna, may obtain a sample of a transmit signal, being transmitted from a communications receiver to a communications antenna 92. The signal of interest may then be obtained from the received signal by removing the interference by using the transmit signal 94. It may then be determined if the communication channel is blocked 96. If the communication channel is blocked, the transmit signal may be stored for later transmission 98. Additionally, a visual or audible indicator may be activated to inform the operator that the transmission has been blocked 100. Once the communication channel is unblocked, the stored transmit signal may be retransmitted 102.

As discussed above, the present invention provides many advantages over previous systems. For example, the system of the present invention may be capable of recognizing when other stations use the same communication channel even if the other station's signal starts simultaneously or after the local signal begins. By recognizing when other stations use the same communication channel, a separate service channel may not be needed and thus does not waste spectrum capacity. Also, the system and method of the present invention may not require that all stations be equipped with the present invention in order for benefit to accrue. If even a single aircraft is equipped, its crew will know if they are involved in a signal blocking situation, whether or not other aircraft are so equipped.

Additional advantages may include avoiding the risk of receiver desensitization that is a consequence of the simultaneous use of a communications and service channel, facilitating receiving a distant station's transmission even while transmitting in the same channel and providing the ability to interrupt and store a message being transmitted, and then later transmitting the stored message into a clear channel.

One or more of the components and/or functions illustrated in FIGS. 1, 2, 4, 5 and/or 6 may be rearranged and/or combined into a single component or embodied in several components without departing from the invention. For instance, transceiver 41 and protection receiver 40 may be separate devices or may be integrated into a single device. Additional elements or components may also be added without departing from the invention.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

What is claimed is:

1. A system for transmitting radio communications, comprising:
   a communications transceiver configured to transmit signals through a communications antenna;
   a protection antenna configured to obtain a received signal containing a signal of interest from a remote transmitter combined with interference from the communications transceiver; and
   a protection receiver coupled to the protection antenna and configured to:
      obtain a sample of a transmit signal,
      obtain the signal of interest by removing the interference from the received signal by using the transmit signal, and
      store the transmit signal if a communication channel is blocked and retransmitting the stored transmit signal when the communication channel is unblocked.

2. The system of claim 1, wherein the protection receiver uses the sample of the transmit signal to cancel at least part of the interference on the communication channel.

3. The system of claim 1, wherein the communications transceiver provides a current operating frequency to the protection receiver.

4. The system of claim 1, wherein the protection receiver determines a current operating frequency by examining characteristics of the sample of the signal.

5. The system of claim 1, further comprising:
   a microphone coupled to the protection receiver for obtaining an audio signal, wherein the protection receiver transmits the audio signal to the communications transceiver for transmission.

6. The system of claim 1, further comprising a push-to-talk switch coupled to the protection receiver for switching the communications transceiver from receive mode to transmit mode.

7. The system of claim 1, wherein a busy signal is sent to a speaker, coupled to the protection receiver, indicating transmission over the communication channel is blocked.

8. The system of claim 1, wherein the communication channel is considered blocked if the remote transmitter is transmitting simultaneously with the communications transceiver on the same communication channel.

9. The system of claim 1, further comprising a warning module, coupled to the protection receiver, for providing visual warnings indicating transmission over the communication channel is blocked.

10. The system of claim 9, wherein the warning module includes one or more lights.

11. The system of claim 1, wherein the communications antenna and the protection antenna are isolated.

12. A method operational in a protection receiver device for preventing lapses of communication in radio voice communications, comprising:
   obtaining at the protection receiver device a received signal containing a signal of interest from a remote transmitter combined with interference from a communications transceiver;
   obtaining a sample of a transmit signal at the protection receiver device;
   obtaining the signal of interest by removing the interference from the received signal by using the transmit signal; and
   storing the transmit signal if a communication channel is blocked and retransmitting the stored transmit signal from the protection receiver device when the communication channel is unblocked.

13. The method of claim 12, further comprising using the sample of the transmit signal to cancel at least part of the interference on the communication channel.

14. The method of claim 12, further comprising receiving a current operating frequency from a communications transceiver.

15. The method of claim 12, further comprising determining a current operating frequency by examining characteristics of the sample of the signal.

16. The method of claim 12, further comprising sending a busy signal to a speaker indicating transmission over the communication channel is blocked.

17. The method of claim 12, further comprising activating a visual indicator indicating transmission over the communication channel is blocked.

18. The method of claim 12, wherein the method is operational on an aircraft when communicating with a ground station.

19. A system for transmitting radio communications, comprising:
   means for obtaining a received signal containing a signal of interest from a remote transmitter combined with interference from a communications transceiver;
   means for obtaining a sample of the transmit signal;
   means for obtaining the signal of interest by removing the interference from the received signal by using the transmit signal; and
   means for storing the transmit signal if a communication channel is blocked and retransmitting the stored transmit signal when the communication channel is unblocked.

20. The system of claim 19, further comprising means for using the sample of the transmit signal to cancel at least part of the interference on the communication channel.

* * * * *